United States Patent
Moon et al.

(10) Patent No.: US 10,951,402 B2
(45) Date of Patent: Mar. 16, 2021

(54) APPARATUS AND METHOD FOR ENCRYPTION

(71) Applicant: SAMSUNG SDS CO., LTD., Seoul (KR)

(72) Inventors: Duk-Jae Moon, Seoul (KR); Kyu-Young Choi, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 263 days.

(21) Appl. No.: 15/708,391

(22) Filed: Sep. 19, 2017

(65) Prior Publication Data

US 2018/0123788 A1    May 3, 2018

(30) Foreign Application Priority Data

Oct. 28, 2016 (KR) .......................... 10-2016-0142252

(51) Int. Cl.
*H04L 9/08* (2006.01)
*G06F 7/58* (2006.01)
*H04L 9/06* (2006.01)

(52) U.S. Cl.
CPC .............. *H04L 9/0869* (2013.01); *G06F 7/58* (2013.01); *H04L 9/0618* (2013.01); *H04L 2209/16* (2013.01); *H04L 2209/24* (2013.01)

(58) Field of Classification Search
CPC ...... G06F 7/58; H04L 9/0618; H04L 2209/16
USPC .......................................................... 380/28
See application file for complete search history.

(56) References Cited

U.S. PATENT DOCUMENTS

2010/0278332 A1* 11/2010 Yamamoto ............ H04L 9/0625
                                                      380/28
2017/0195117 A1*  7/2017 Wu .......................... G09C 1/00

FOREIGN PATENT DOCUMENTS

| CN | 101073220 A    | 11/2007 |
|----|----------------|---------|
| CN | 105227308 A    | 1/2016  |
| KR | 10-1593169 B1  | 2/2016  |
| KR | 10-2016-0024504 A | 3/2016 |

(Continued)

OTHER PUBLICATIONS

Communication dated May 25, 2018, issued by the Korean Intellectual Property Office in counterpart Korean Patent Application No. 10-2016-0142252.

(Continued)

*Primary Examiner* — Brandon S Hoffman
*Assistant Examiner* — Nega Woldemariam
(74) *Attorney, Agent, or Firm* — Sughrue Mion, PLLC (57) ABSTRACT

Disclosed are an apparatus and method for encryption. The encryption apparatus includes a key table generator configured to generate at least one encryption key table from random values obtained from a seed value and generate at least one decryption key table from the at least one encryption key table; an algorithm generator configured to generate an encryption algorithm having a Misty structure that has a round function to which the at least one encryption key table is applied and a decryption algorithm having a Misty structure that has a round function to which the at least one decryption key table is applied; an encryptor configured to encrypt plaintext data with the encryption algorithm; and a decryptor configured to decrypt encrypted data with the decryption algorithm.

12 Claims, 7 Drawing Sheets

(56) References Cited

FOREIGN PATENT DOCUMENTS

WO 2016/043665 A1 3/2016

OTHER PUBLICATIONS

Communication dated Apr. 27, 2020, issued by the State Intellectual Property Office of P.R. China in counterpart Chinese Application No. 201710805322.7.

* cited by examiner

FIG.7

APPARATUS AND METHOD FOR ENCRYPTION

CROSS-REFERENCE TO RELATED APPLICATION

This application claims priority to and the benefit of Korean Patent Application No. 10-2016-0142252, filed on Oct. 28, 2016, the disclosure of which is incorporated herein by reference in its entirety.

BACKGROUND

1. Field

Embodiments of the present disclosure relate to encryption technology.

2. Discussion of Related Art

A conventional white-box cipher algorithm may be differently implemented depending on internal characteristics of a symmetric-key cipher algorithm on which the white-box cipher algorithm is based. Since the conventional white-box cipher algorithm depends on its base algorithm, it is difficult to reflect a change in a unit input size according to an application environment.

Also, a conventional white-box cipher algorithm has many additional operations inserted to protect a cipher key of its base algorithm, and thus this causes reduction in efficiency by a factor of several tens, compared to the base algorithm.

SUMMARY

Embodiments of the present disclosure are directed to providing an apparatus and method for encryption.

According to an aspect of the present disclosure, there is provided an encryption apparatus including a key table generator configured to generate at least one encryption key table from random values obtained from a seed value and generate at least one decryption key table from the at least one encryption key table, an algorithm generator configured to generate an encryption algorithm having a Misty structure that has a round function to which the at least one encryption key table is applied and a decryption algorithm having a Misty structure that has a round function to which the at least one decryption key table is applied, an encryptor configured to encrypt plaintext data with the encryption algorithm, and a decryptor configured to decrypt encrypted data with the decryption algorithm.

The key table generator may generate, from the at least one encryption key table, a decryption key table having an inverse function relationship with the encryption key table.

The seed value may be an initial input value that is expressible by a bit string.

The seed value may be one of a cipher key, a counter value, and an initialization vector.

The key table generator may determine a size of the random values based on a size of an available memory for encryption.

The algorithm generator may determine the number of branches of the Misty structure based on a size of a unit input and a size of the random values.

The number of branches may be determined by the following equation:

$$b = \frac{n}{k}, b > 2, k \geq 3,$$

where b is the number of branches, n is the size of the unit input, and k is the size of the random values.

The algorithm generator may determine the number of rounds of the Misty structure based on a required security level.

According to an aspect of the present disclosure, there is provided an encryption method including generating random values obtained from a seed value, generating at least one encryption key table from the random values, generating at least one decryption key table from the at least one encryption key table, generating an encryption algorithm having a Misty structure that has a round function to which the at least one encryption key table is applied and a decryption algorithm having a Misty structure that has a round function to which the at least one decryption key table is applied, encrypting plaintext data with the encryption algorithm, and decrypting encrypted data with the decryption algorithm.

The generating of at least one decryption key table may include generating, from the at least one encryption key table, a decryption key table having an inverse function relationship with the encryption key table.

The seed value may be an initial input value that is expressible by a bit string.

The seed value may be one of a cipher key, a counter value, and an initialization vector.

The generating of random values may include determining a size of the random values based on a size of an available memory for encryption.

The generating of algorithms may include determining the number of branches of the Misty structure based on a size of a unit input and a size of the random values.

The number of branches may be determined by the following equation:

$$b = \frac{n}{k}, b > 2, k \geq 3,$$

where b is the number of branches, n is the size of the unit input, and k is the size of the random values.

The generating of algorithms may include determining the number of rounds of the Misty structure based on a required security level.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. The following detailed description is provided to assist the reader in gaining a comprehensive understanding of the methods, apparatuses, and/or systems described herein. However, the description is only an example, and the present disclosure is not limited thereto.

In describing embodiments of the present disclosure, when it is determined that a detailed description of known techniques associated with the present disclosure would unnecessarily obscure the subject matter of the present disclosure, the detailed description thereof will be omitted. Also, terms used herein are defined in consideration of the functions of the present disclosure and may be changed depending on a user, the intent of an operator, or a custom. Accordingly, the terms must be defined based on the following overall description of this specification. The terminology used herein is for the purpose of only describing embodiments of the present disclosure and should not be restrictive. The singular forms "a," "an" and "the" are intended to include the plural forms as well, unless the context clearly indicates otherwise. It should be understood that the terms "comprises," "comprising," "includes" and/or "including" specify the presence of stated features, integers, steps, operations, elements, and/or components when used herein, but do not preclude the presence or addition of one or more other features, integers, steps, operations, elements, components, and/or groups thereof.

Figure 1:
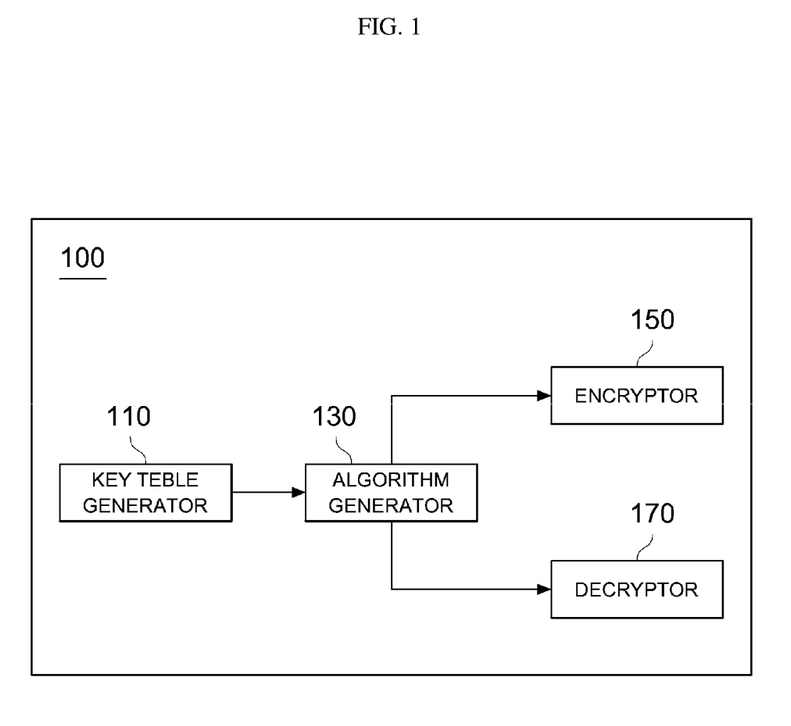
FIG. 1 is a block diagram of an encryption apparatus according to an embodiment of the present disclosure.

FIG. 1 is a block diagram of an encryption apparatus according to an embodiment of the present disclosure.

Referring to FIG. 1, an encryption apparatus 100 according to an embodiment of the present disclosure includes a key table generator 110, an algorithm generator 130, an encryptor 150, and a decryptor 170.

The key table generator 110 generates random values obtained from a seed value and generates at least one encryption key table from the generated random values. Also, the key table generator 110 generates at least one decryption key table from the generated at least one encryption key table.

In this case, the encryption key table may be a lookup table composed of the random values obtained from the seed value.

The decryption key table may be a key table having an inverse function relationship with the encryption key table. In detail, after generating the encryption key table, the key table generator 110 may generate the decryption key table having an inverse function relationship with the generated encryption key table.

Hereinafter, the term "key table" is used to include all of the encryption key table and the decryption key table.

The seed value may refer to an initial input value that is expressible by a bit string. For example, the see value may include a cipher key, a counter value used in a block encryption operation mode, an initialization vector composed of any bit string, etc.

According to an embodiment of the present disclosure, a size of the random values generated by the key table generator 110 may be determined according to an available memory size that may be used for encryption in a computing environment to which the encryption apparatus 100 is applied.

The algorithm generator 130 generates an encryption algorithm having a Misty structure including a round function with the encryption key table generated by the key table generator 110 applied thereto. Also, the algorithm generator 130 generates an decryption algorithm having a Misty structure including a round function with the decryption key table generated by the key table generator 110 applied thereto.

In detail, the algorithm generator 130 may determine the numbers of branches and rounds of the Misty structure in order to generate the encryption algorithm and the decryption algorithm.

In this case, according to an embodiment of the present disclosure, the number of branches of the Misty structure may be determined according to a size of a unit input for the encryption and decryption and a size of a random value constituting the key table. In detail, for example, the algorithm generator 130 may determine the number of branches b of the Misty structure on the basis of the following Equation 1:

$$b = \frac{n}{k}, b > 2, k \geq 3,$$

where n is the size (bit) of the unit input, and k is the size (bit) of the random value constituting the key table.

According to an embodiment of the present disclosure, the number of rounds of the Misty structure may be determined according to a security level required in an environment in which the encryption apparatus 100 is applied.

When the numbers of branches and rounds of the Misty structure are determined, the algorithm generator 130 may generate the encryption algorithm by applying the encryption key table to each round function of the Misty structure composed of the determined numbers of branches and rounds.

Also, the algorithm generator 130 may generate the decryption algorithm by applying the decryption key table to each round function of the Misty structure composed of the same numbers of branches and rounds as the encryption algorithm.

In this case, according to an embodiment of the present disclosure, the encryption algorithm and the decryption algorithm generated by the algorithm generator 130 may be generated on the basis of a conventional cipher algorithm having the Misty structure. For example, the algorithm generator 130 may generate the encryption algorithm and the decryption algorithm by changing the numbers of branches and rounds of the Misty structure and applying the encryption key table and the decryption key table to each round function on the basis of the conventional cipher algorithm of the Misty structure.

The encryptor 150 encrypts plaintext data with the encryption algorithm generated by the algorithm generator 130.

The decryptor 170 decrypts encrypted data with the decryption algorithm generated by the algorithm generator 130.

Figure 2:
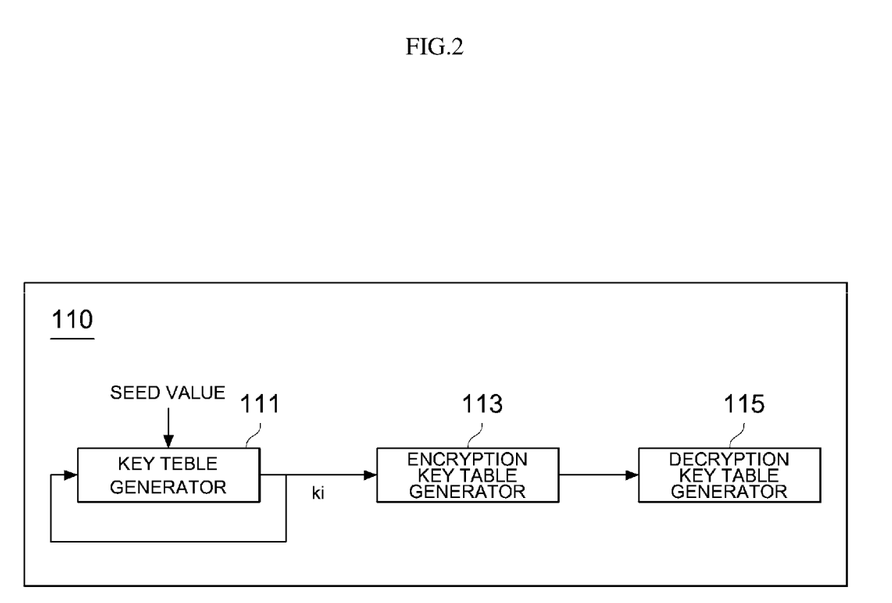
FIG. 2 is a detailed block diagram of a key table generator according to an embodiment of the present disclosure.

FIG. 2 is a detailed block diagram of the key table generator 110 according to an embodiment of the present disclosure.

Referring to FIG. 2, the key table generator 110 may include a key generator 111 configured to generate a plurality of sub-keys from a seed value, an encryption key table generator 113 configured to generate an encryption key table using the generated sub-keys, and a decryption key table generator 115 configured to generate a decryption key table from the generated encryption key table.

In detail, after receiving a seed value and generating a sub-key, the key generator 111 may repeatedly generate a new sub-key from the previous sub-key. For example, when it is assumed that three sub-keys are generated, the key generator 111 may generate a random number from the received seed value and generate a first sub-key. Subsequently, the key generator 111 may generate a random number from the generated first sub-key and generate a second sub-key and then may generate a random number from the generated second sub-key and generate a third sub-key.

The encryption key table generator 113 may generate random values for configuring the encryption key table from the sub-keys generated from the key generator 111 and may generate an encryption key table including the generated random values. In detail, the encryption key table generator 113 may generate random values by using a round function for generating a random value from an input sub-key to apply the sub-keys to the round function every round.

The decryption key table generator 115 may generate a decryption key table from the encryption key table generated by the encryption key table generator 113. In detail, the decryption key table generator 115 may generate a decryption key table having an inverse function relationship with the encryption key table generated by the encryption key table generator 113.

Figure 3:
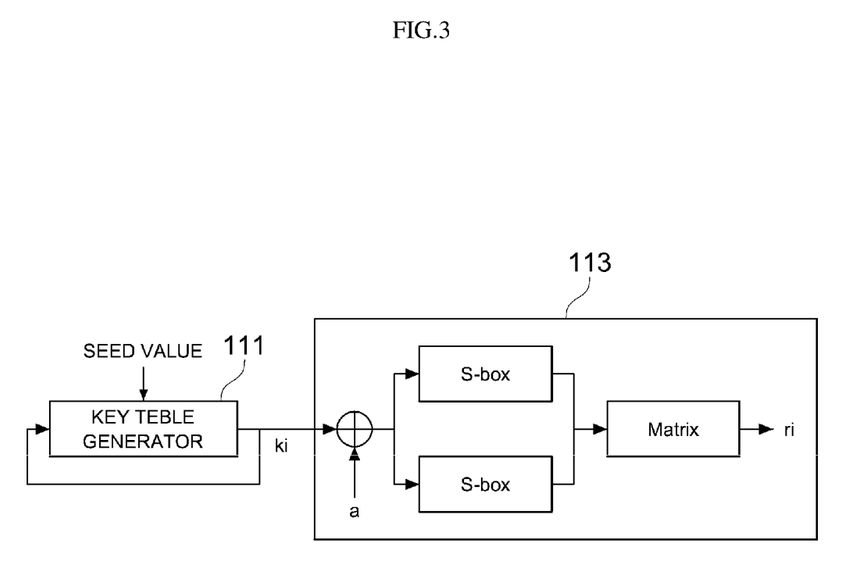
FIG. 3 is a diagram showing an example of a round function used in an encryption key table generator.

In detail, FIG. 3 is a diagram showing an example of a round function used by the encryption key table generator 113.

Referring to FIG. 3, the encryption key table generator 113 may perform an XOR operation between a sub-key ki generated by the key generator 111 and a random value a with the same size as the sub-key ki and may divide a result of the XOR operation into two parts and apply the two parts to respective S-boxes. Subsequently, the encryption key table generator 113 may perform a matrix operation between output result values of the two S-boxes to generate a random value ri. In this case, various matrix operations having characteristics for maximizing diffusion effect on an input value, such as a matrix operation using a maximum distance separable (MDS) matrix, may be used as the matrix operation.

The generation of the encryption key table performed by the key table generator 110 is not necessarily limited to the examples shown in FIGS. 2 and 3. For example, the key table generator 110 may generate random values from a seed value in various methods having a one-way property other than the examples shown in FIGS. 2 and 3 and may generate an encryption key table including the generated random values.

Figure 4:
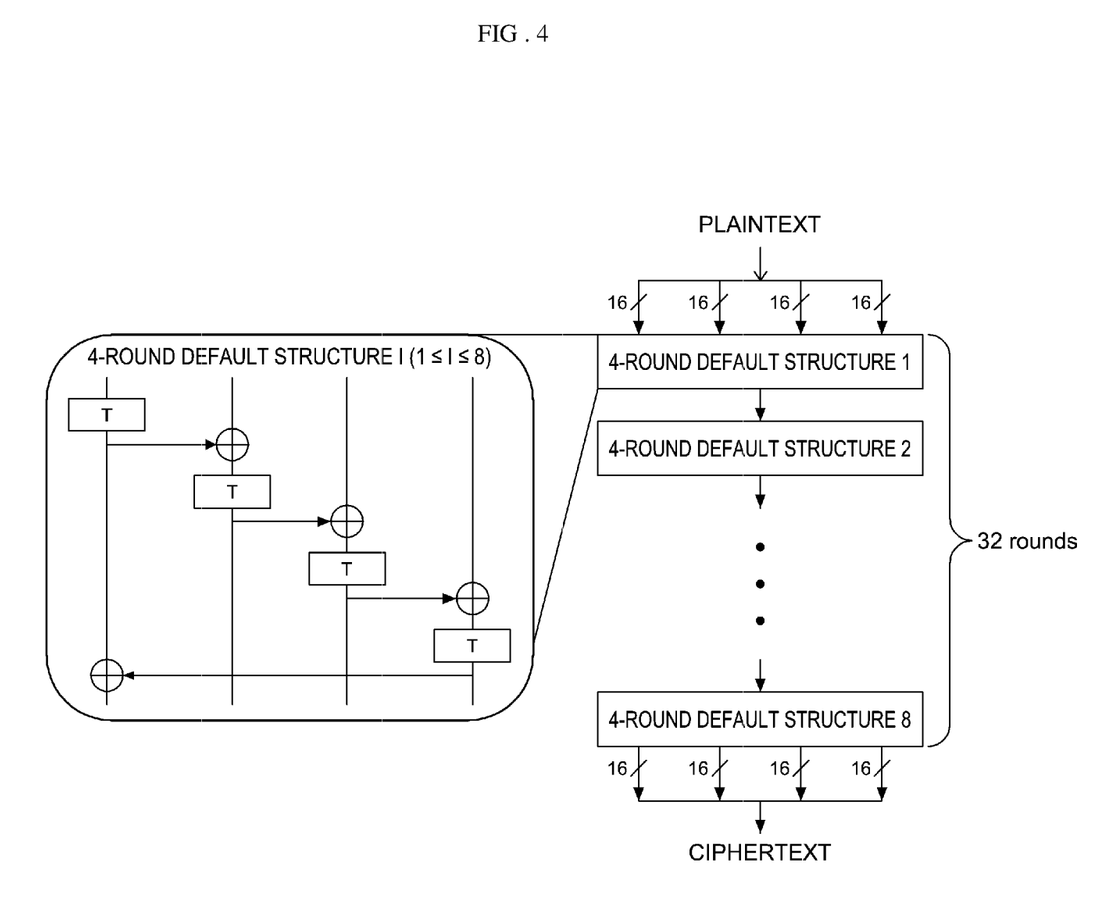
FIG. 4 is a diagram showing a Misty structure of an encryption algorithm generated according to an embodiment of the present disclosure.

FIG. 4 is a diagram showing a Misty structure of an encryption algorithm generated according to an embodiment of the present disclosure.

In FIG. 4, it is assumed that a size of a unit input of plaintext data to be encrypted and a size of random values constituting an encryption key table T are 64 bits and 16 bits, respectively.

For example, the algorithm generator 130 may configure a 4-round default structure that has four branches determined according to the above Equation 1 and uses the encryption key table T as a round function. After configuring the 4-round default structure, the algorithm generator 130 may a Misty structure so that the 4-round default structure is repeatedly performed according to the number of rounds (32 rounds in the shown example) determined according to a security level.

For the shown 4-round default structure, a block value input to a first branch with respect to the left side in a first round is converted into a corresponding random value through the encryption key table T, and the converted random value is combined with a block value input to a second branch through an XOR operation. Subsequently, in a second round, the value generated through the first round is converted into a corresponding random value through the encryption key table T, and the converted random value is combined with a block value input to a third branch through an XOR operation. Subsequently, a third round and a fourth round are performed in the same manner. In the fourth round, a random value converted through the encryption key table T is combined with the random value in the first branch through an XOR operation.

Figure 5:
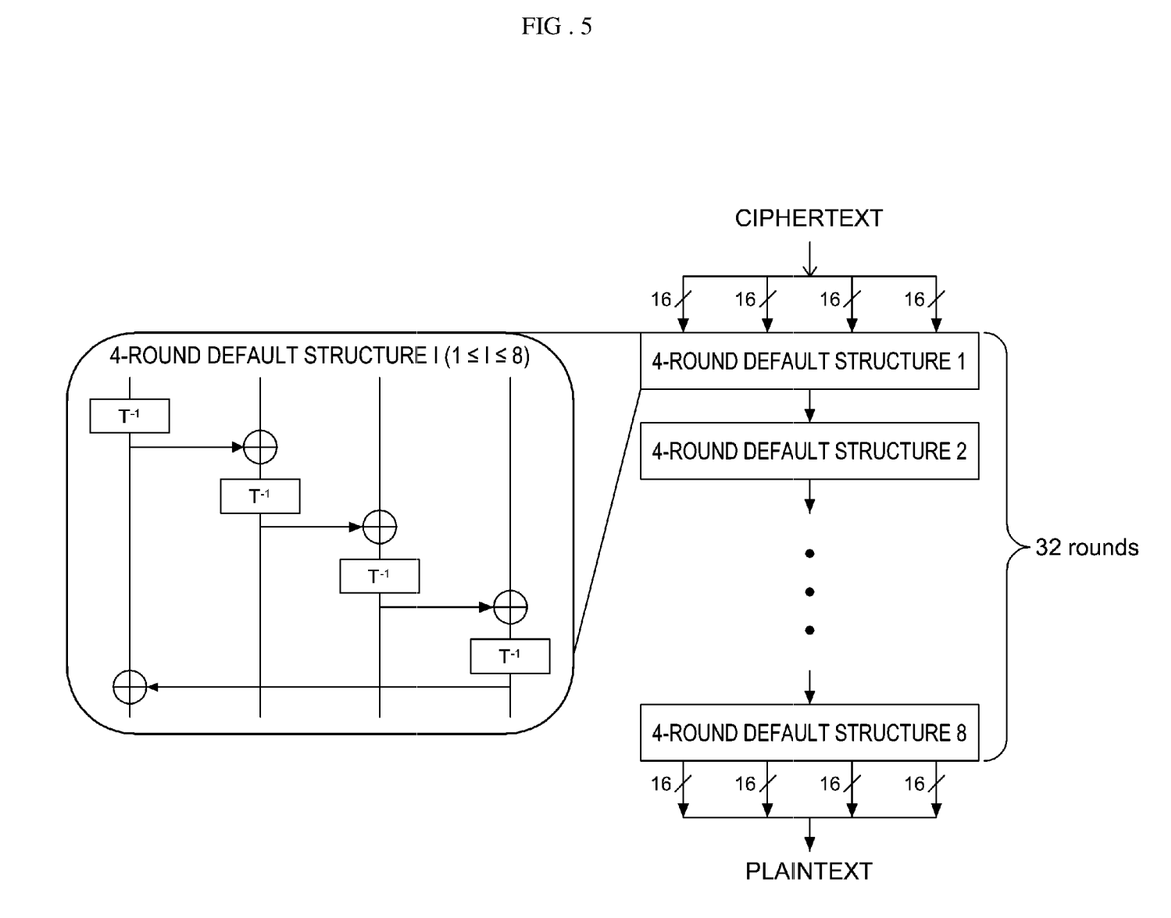
FIG. 5 is a diagram showing a Misty structure of a decryption algorithm generated according to an embodiment of the present disclosure.

FIG. 5 is a diagram showing a Misty structure of a decryption algorithm generated according to an embodiment of the present disclosure.

In FIG. 5, it is assumed that a size of a unit input of ciphertext data to be decrypted and a size of random values constituting a decryption key table $T^{-1}$ are 64 bits and 16 bits, respectively.

For example, the algorithm generator 130 may configure a 4-round default structure that has four branches determined according to the above Equation 1 and uses the decryption key table $T^{-1}$ as a round function. After configuring the 4-round default structure, the algorithm generator 130 may a Misty structure so that the 4-round default structure is repeatedly performed according to the number of rounds (32 rounds in the shown example) determined according to a security level.

For the shown default structure, a block value input to a first branch with respect to the left side in a first round is converted into a corresponding random value through the decryption key table $T^{-1}$, and the converted random value is combined with a block value input to a second branch through an XOR operation. Subsequently, in a second round, the value generated through the first round is converted into a corresponding random value through the decryption key table $T^{-1}$, and the converted random value is combined with a block value input to a third branch through an XOR operation. Subsequently, a third round and a fourth round are performed in the same manner. In the fourth round, a random value converted through the decryption key table $T^{-1}$ is combined with the random value in the first branch through an XOR operation.

In the example shown in FIGS. 4 and 5, it has been illustrated that the encryption key table T and the decryption key table $T^{-1}$ are used as a round function of each round of the Misty structure. However, the present disclosure is not limited thereto. For example, the round function of each round may be obtained by changing a portion of round functions used in a cipher algorithm having a Misty structure on which the round function is based to the encryption key table T or the decryption key table $T^{-1}$.

In an embodiment of the present disclosure, the key table generator 110, the algorithm generator 130, the encryptor 150, and the decryptor 170 shown in FIG. 1 may be implemented in at least one computing apparatus including at least one processor and a computer-readable recording medium connected with the processors. The computer-readable recording medium may be disposed inside or outside the processor, and may be connected with the processor using various well-known means. The processor in the computing apparatus may enable the computing apparatus to operate according an example embodiment described in this specification. For example, the processor may execute an instruction stored in the computer-readable recording medium, and the instruction stored in the computer-readable recording medium may be configured to enable the computing apparatus to perform operations according to an example embodiment described in this specification when the instruction is executed by the processor.

Figure 6:
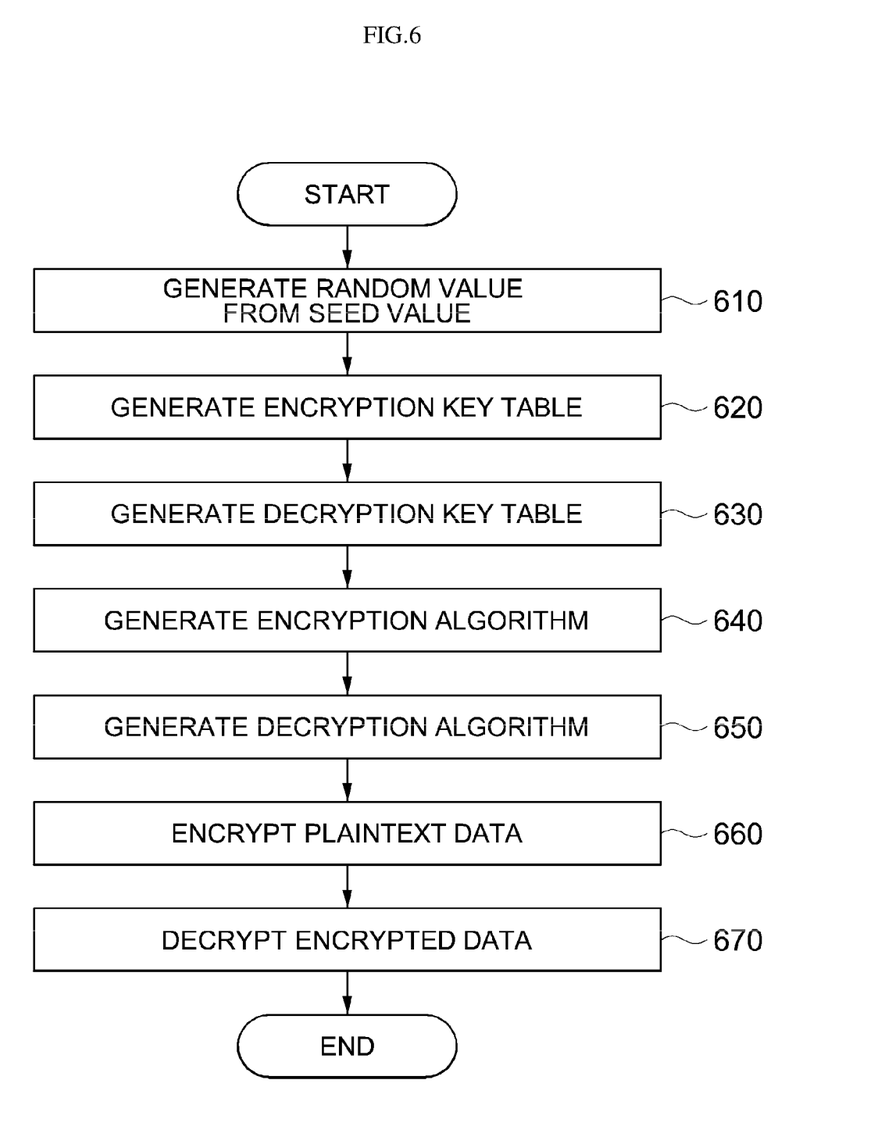
FIG. 6 is a flowchart of an encryption method according to an embodiment of the present disclosure.

FIG. 6 is a flowchart of an encryption method according to an embodiment of the present disclosure.

The method shown in FIG. 6 may be performed by the encryption apparatus 100 shown in FIG. 1.

Referring to FIG. 6, the encryption apparatus 100 generates random values derived from a seed value (610).

Subsequently, the encryption apparatus 100 generates at least one encryption key table from the generated random values (620). In this case, a size of the random values may be determined according to an available memory size.

Subsequently, the encryption apparatus 100 generates at least one decryption key table from the generated at least one encryption key table (630). In this case, the decryption key table may have an inverse function relationship with the encryption key table.

Subsequently, the encryption apparatus 100 generates an encryption algorithm having a Misty structure that includes round functions to which the encryption key table is applied (640).

Also, the encryption apparatus 100 generates a decryption algorithm having a Misty structure that includes round functions to which the decryption key table is applied (650).

Subsequently, the encryption apparatus 100 encrypts plaintext data with the generated encryption algorithm (660).

Also, the encryption apparatus 100 decrypts encrypted data with the generated decryption algorithm (670).

Figure 7:
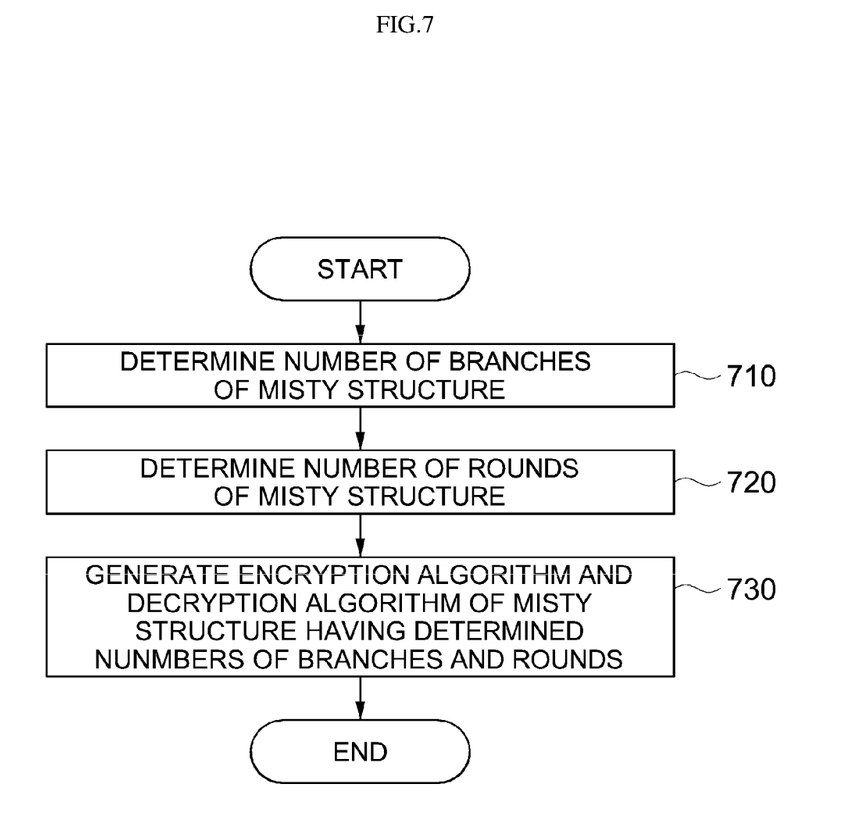
FIG. 7 is a flowchart showing a procedure of generating an encryption algorithm and a decryption algorithm according to an embodiment of the present disclosure.

FIG. 7 is a flowchart showing a procedure of generating an encryption algorithm and a decryption algorithm according to an embodiment of the present disclosure.

Referring to FIG. 7, the encryption apparatus 100 determines the number of branches of the Misty structure on the basis of a size of a unit input and a size of random values constituting a key table (710).

Subsequently, the encryption apparatus 100 may determine the number of rounds of the Misty structure on the basis of a required security level (720).

Subsequently, the encryption apparatus 100 generates an encryption algorithm and a decryption algorithm having a Misty structure having the determined numbers of branches and rounds (730).

In detail, the encryption apparatus 100 may generate the encryption algorithm by applying an encryption key table to each round function of the Misty structure composed of the determined number of branches and rounds.

Also, the encryption apparatus 100 may generate the decryption algorithm by applying a decryption key table to each round function of the Misty structure composed of the same numbers of branches and rounds as the encryption algorithm.

In the flowcharts shown in FIGS. 6 and 7, the methods have been described as having a plurality of steps. However, at least some of the steps are performed in the exchanged order, performed in combination with another step, omitted, divided into sub-steps, or performed in addition to one or more steps that are not shown.

Embodiments of the present disclosure may include a computer-readable recording medium including a program for executing the methods described herein on a computer. The computer-readable recording medium may include any one or a combination of a program instruction, a local data file, a local data structure, etc. The medium may be designed and configured specifically for the present disclosure or can be typically available in the field of computer software. Examples of the computer-readable recording medium include a magnetic medium, such as a hard disk, a floppy disk, and a magnetic tape, an optical recording medium, such as a CD-ROM and a DVD, a magneto-optical medium, such as a floptical disk, and a hardware device specially configured to store and perform a program instruction, such as a ROM, a RAM, and a flash memory. Examples of the program instruction may include a machine code generated by a compiler and a high-level language code that can be executed in a computer using an interpreter.

According to embodiments of the present disclosure, it is possible to realize safe data encryption in a white-box environment without an additional operation process for protecting a cipher key by using an encryption algorithm having a Misty structure to which a key table for protecting the cipher key in the white box environment is applied to a round function.

Also, according to embodiments of the present disclosure, it is possible to realize an encryption algorithm configuration optimized for an encryption application environment by variably adjusting a key table size and the numbers of branches and rounds of the Misty structure depending on the encryption application environment.

Furthermore, according to embodiments of the present disclosure, it is possible to secure safety even when an encryption algorithm or decryption algorithm is stolen by an attacker because an encryption process and a decryption process may be designed differently from each other by using an encryption algorithm to which an encryption key table is applied and a decryption algorithm to which a decryption key table is applied.

Although example embodiments of the present disclosure have been described in detail, it will be understood by those skilled in the art that various changes may be made without departing from the spirit or scope of the present disclosure. Thus, the scope of the present disclosure is to be determined by the following claims and their equivalents, and shall not be restricted or limited by the foregoing detailed description.

What is claimed is:

1. An encryption apparatus comprising:
at least one processor configured to implement:
a key table generator configured to generate at least one encryption key table from random values obtained from a seed value and generate at least one decryption key table from the at least one encryption key table;
an algorithm generator configured to generate an encryption algorithm having a first Misty structure that has a first round function to which the at least one encryption key table is applied and a decryption algorithm having a second Misty structure that has a second round function to which the at least one decryption key table is applied;
an encryptor configured to encrypt plaintext data with the encryption algorithm; and
a decryptor configured to decrypt the encrypted plaintext data with the decryption algorithm,
wherein each of the at least one encryption key table and the at least one decryption key table is a lookup table,
wherein the key table generator determines a size of the random values based on an amount of memory available for encryption, and
wherein the algorithm generator determines a number of branches of the first Misty structure based on a size of a unit input and a size of the random values.

2. The encryption apparatus of claim 1, wherein the key table generator generates, from the at least one encryption key table, a decryption key table of the at least one decryption key table, having an inverse function relationship with an encryption key table of the at least one encryption key table.

3. The encryption apparatus of claim 1, wherein the seed value is received by the key table generator and is expressible by a bit string.

4. The encryption apparatus of claim 3, wherein the seed value is one from among a cipher key, a counter value, and an initialization vector.

5. The encryption apparatus of claim 1, wherein the number of branches is determined by:

$$b = \frac{n}{k}, b > 2, k \geq 3,$$

where b is the number of branches, n is the size of the unit input, and k is the size of the random values.

6. The encryption apparatus of claim 1, wherein the algorithm generator determines a number of rounds of the first Misty structure based on a security level.

7. An encryption method comprising:
generating random values based on a seed value;
generating at least one encryption key table from the random values;
generating at least one decryption key table from the at least one encryption key table;
generating an encryption algorithm having a first Misty structure that has a first round function to which the at least one encryption key table is applied and a decryption algorithm having a second Misty structure that has a second round function to which the at least one decryption key table is applied;
encrypting plaintext data with the encryption algorithm; and
decrypting the encrypted plaintext data with the decryption algorithm,
wherein each of the at least one encryption key table and the at least one decryption key table is a lookup table, and
wherein the generating of random values comprises determining a size of the random values based on an amount of memory available for encryption, and
wherein the generating of the encryption and the decryption algorithms comprises determining a number of branches of the first Misty structure based on a size of a unit input and a size of the random values.

8. The encryption method of claim 7, wherein the generating of at least one decryption key table comprises generating, from the at least one encryption key table, a decryption key table of the at least one decryption key table, having an inverse function relationship with an encryption key table of the at least one encryption key table.

9. The encryption method of claim 7, wherein the seed value is expressible by a bit string.

10. The encryption method of claim 9, wherein the seed value is one from among a cipher key, a counter value, and an initialization vector.

11. The encryption method of claim 7, wherein the number of branches is determined by:

$$b = \frac{n}{k}, b > 2, k \geq 3,$$

where b is the number of branches, n is the size of the unit input, and k is the size of the random values.

12. The encryption method of claim 7, wherein the generating the encryption and the decryption algorithms comprises determining a number of rounds of the first Misty structure based on a security level.

* * * * *